May 27, 1969   M. LEVA   3,446,489
LIQUID DISTRIBUTORS AND REDISTRIBUTORS FOR CONTACT TOWERS
Filed July 8, 1965
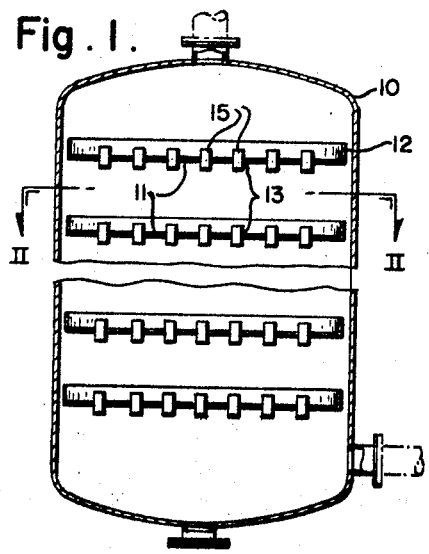
Fig. 1.
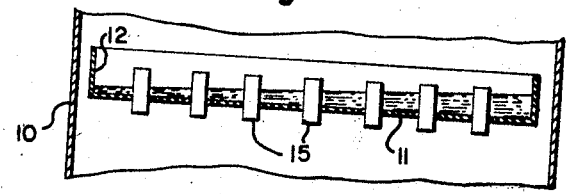
Fig. 2.
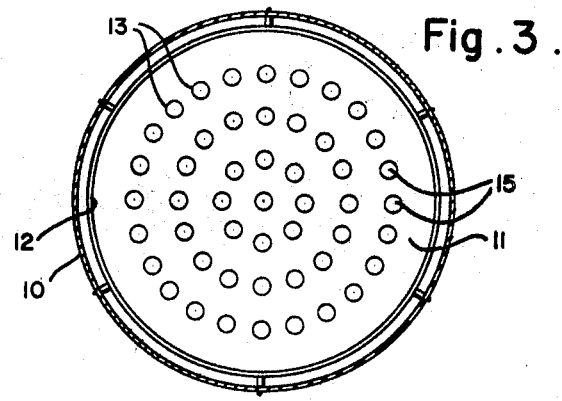
Fig. 3.
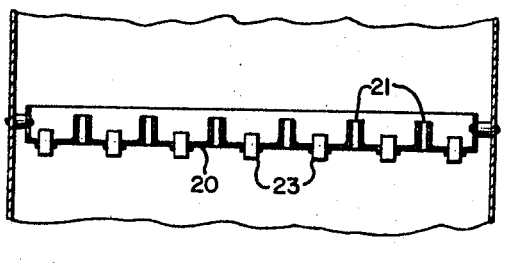
Fig. 4.
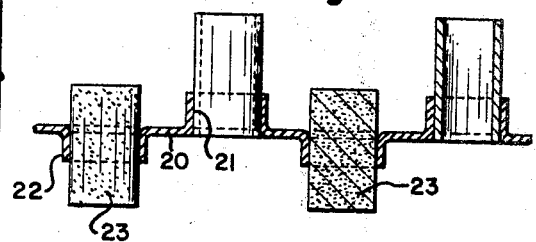
Fig. 5.
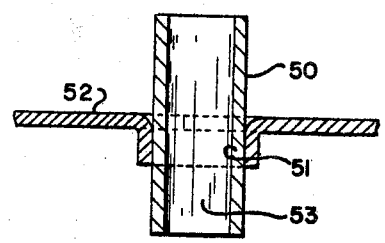
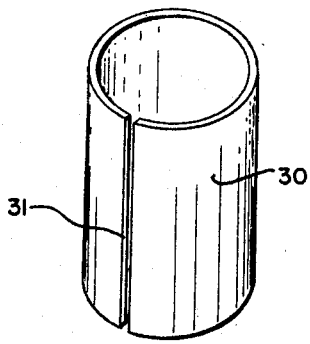
Fig. 6.
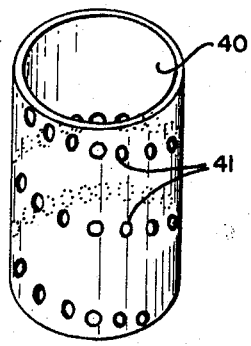
Fig. 7.
Fig. 8.
INVENTOR
Max Leva

United States Patent Office 3,446,489
Patented May 27, 1969

3,446,489
LIQUID DISTRIBUTORS AND REDISTRIBUTORS FOR CONTACT TOWERS
Max Leva, 1030 Dallett Road, Pittsburgh, Pa. 15227
Filed July 8, 1965, Ser. No. 470,369
Int. Cl. B01d 3/22
U.S. Cl. 261—97   8 Claims

ABSTRACT OF THE DISCLOSURE

A liquid distributor for contact towers having at least one horizontal plate secured to the walls of the tower, flange means around the periphery of the plate defining a well, a plurality of openings distributed over the plate surface and a porous member in each opening communicating through said plate, the porosity of said members being adjusted so that their output substantially equals the normal input onto the plate.

---

This invention relates to liquid distributors for contact towers such as columns packed with packings, plates, or both packings and plates, and particularly to a liquid distributor for use in fractionation, absorption, desorption, steam stripping, extraction, or other packed or plate tower operations.

It is a well-known fact that most packed as well as many plate towers or columns, such as are used in fractionation, absorption, extraction and the like, often suffer from inefficient contact between downflowing liquid and upflowing vapor and/or gases due to liquid maldistribution or by-passing occurring in the tower. Whereas this maldistribution of downflowing liquid is often due to inefficient tower packings being used in the towers, or due to the use of plates with unsatisfactory hydraulic characteristics, it has also been found that maldistributions of liquid are often caused by the fact that towers are not absolutely plumb. Obviously, in a tower which is not plumb the liquid will tend to run to one side and the vapor primarily up the opposite side. This separation of flows will always result in a reduction of contacting efficiency. Since it is virtually impossible to keep a tower always plumb, even if so installed originally, the accessories attached to the tower, vibrations and shifts in foundations and other things will invariably give more or less inclination to the towers, and hence efficiencies will tend to decrease.

It has been attempted to overcome the reduction in contacting efficiency which is due to the separation of liquid and gas flows through towers, by the use of certain liquid distributors to the top of the packings or plates in towers, as well as the use of such or similar devices between packed or plate sections. In this latter case the device is then known as a liquid redistributor. The usual types of distributors thus used are in essence flat pans or troughs, provided with proper openings for gas passage upward and relatively small pipes serving liquid flow downward. Moreover, the liquid-carrying pipes are sometimes provided with weir openings where the liquid enters. Furthermore, liquid distributors are known which are in essence a system of slotted troughs arranged in parallel with a central feed point. Of course many modifications of these designs are known. Whereas these distributors will function usually satisfactorily when installed strictly in a horizontal position and when they are called upon to handle relatively large liquid loads, they will cease to function when the tower in which they are installed is tilted, or when they must handle small liquid rates which are frequently met in vacuum towers. A few liquid distributors of this type are referred to in U.S. Patents 3,006,623 and 2,428,922 and elsewhere. As far as redistribution of liquid is concerned, the above-mentioned constructions have also been used, as well as constructions described in U.S. Patents 2,639,130 and 3,099,-697. But here too it is readily seen that these constructions, too, will not function properly when the tower is not in a plumb position.

I have developed a distributor which makes it possible to assure distribution of fluid equally over all succeeding treating plates and areas, even though the quantity of liquid to be distributed is very small as is frequently met in vacuum distillation, and even though the tower in which my liquid distributor or redistributor is installed is no longer in a plumb position.

In a preferred embodiment, I provide in a column at least one horizontal plate secured in the inner wall of the column, a plurality of openings distributed in said plate, a porous member in each of said openings adapted to convey fluid therethrough, said members having a throughput substantially equal to the input to the plate, whereby the fluid delivered to the plate is transferred through all of said porous members from one side to the other. The openings may be regularly or randomly distributed in said plate, although I prefer a regular or equal distribution.

In the foregoing general statement, I have set out certain objects, purposes and advantages of my invention. Other objects, purposes and advantages will be obvious from a consideration of the following description and the accompanying drawings in which:

FIGURE 1 is a vertical section through a tower embodying a fluid distributor according to the invention;

FIGURE 2 is an enlarged fragmentary vertical segment of a tower showing the out-of-plumb condition;

FIGURE 3 is a section on the line II—II of FIGURE 1;

FIGURE 4 is an enlarged fragmentary vertical section through a tower including a second embodiment of fluid distributor;

FIGURE 5 is an enlarged segmental view of the porous member of the fluid distributor of FIGURE 4 with the plate in section;

FIGURE 6 is a third embodiment of porous member;

FIGURE 7 is a fourth embodiment of a porous member; and

FIGURE 8 is a fifth embodiment of a porous member according to my invention.

Referring to the drawings, I have illustrated a reaction tower 10 having a plurality of liquid distributors 11 spaced apart vertically in the tower. The number and size of the distributors will vary according to the height and size of the column. The distributor 11 consists of a base plate with upstanding peripheral flange 12 and a plurality of through passages 13. Each of the through passages 13 is provided with a porous insert 15 of ceramic frit, fused quartz or silica or any other well-known porous member. The porosity of the porous members is adjusted and selected so that the total delivery through the porous members is substantially equal to the normal input onto the plate 11. This being the case, the fluid delivered to the plate 11 will rise until all of the porous members are in contact with the liquid after which time all porous members will deliver fluid through the plate so as to produce a fluid discharge uniformly beneath the plate over the entire area of the plate. Gas may flow upwardly around flanges 12 and through the porous members.

In the embodiment illustrated in FIGURES 4 and 5, I provide a plate 20 having passages 21 for free flow of fluid extending vertically above the plate surface and formed by punching an opening through the plate. Intermediate each of the passages 21 is a downwardly extending passage 22 formed by pressing an opening in the opposite direction. A porous frit member 23 is inserted in each of the openings 22 and held there by frictional engagement or other mechanical means. The porosity of the members 23 is regulated so that they deliver a volume of liquid substantially equal to the volume of liquid delivered onto plate 20.

In FIGURE 6, I have illustrated another form of porous member formed by a cylindrical wall 30 having a slit 31 along one edge forming an access to the interior of the cylinder, this slit being adjusted in width so that when all of the corresponding members are surrounded by fluid, the delivery through all of the slots equals the total delivery onto the plate.

In FIGURE 7, I have illustrated still another form of porous member in which a cylindrical wall of metal or other material 40 is provided with through passages 41 from the exterior to the interior of the cylinder through the wall, said openings lying on a helix running around the periphery of the cylinder, the openings being adjusted in size so that when fluid surrounds all of the cylinders on a given plate the delivery from the plates is substantially equal to the fluid delivered onto the plates. The fluid delivery may be more accurately controlled by varying the size of the openings from top to bottom of the cylinder.

In FIGURE 8, I have illustrated a hollow cylinder of porous frit 50 adapted to be frictionally held in an opening 51 in plate 52 so that the cylinder extends substantially above the surface of the plate 52 and normally distributes the liquid on the plate through the frit walls. However, in the event that the porosity is lost by accumulated dirt, sediment or the like, fluid is still carried through the plate by means of the hollow center portions 53 of the cylinder 50.

In the foregoing description I have set out certain preferred embodiments of my invention. It will be understood, however, that this invention is not so limited and may be otherwise embodied within the scope of the following claims.

I claim:

1. In a contact tower, means for distributing the downflowing liquid comprising at least one horizontal plate member secured transversely to the vertical wall of said column, flange means vertically upstanding around the periphery of said plate member defining a well, a plurality of openings distributed over the surface of said plate and communicating from one side to the other, a porous member in each of said openings and which is located within the plane of said plate member and perforated throughout the height of said opening.

2. In a contact tower, means for distributing the downflowing liquid comprising at least one horizontal plate member secured transversely to the vertical wall of said column, flange means vertically upstanding around the periphery of said plate member defining a well, a plurality of openings distributed over the surface of said plate member and communicating from one side to the other thereof, a hollow cylindrical porous member in each of said openings extending above the plane of the plate member and having a multiplicity of minute pores extending throughout the entire body of said porous member to greatly restrict the rate of flow of fluid therethrough, said porous member having a central axial overflow passage, the porosity of said porous members being adjusted so that the total throughput through all porous members substantially equals the normal input onto the plate member.

3. In a contact tower, means for distributing the downflowing liquid comprising at least one horizontal plate member secured transversely to the vertical wall of said column, flange means vertically upstanding around the periphery of said plate member defining a well, a plurality of openings distributed over the surface of said plate member and communicating from one side to the other thereof, a cylindrical hollow member and extending above and below each of said openings having a plurality of passages throughout its entire height thereof communicating into the hollow interior.

4. In a contact tower as recited in claim 3 wherein the plurality of passages are arranged helically around the wall of the cylindrical hollow member.

5. In a contact tower, means for distributing the downflowing liquid comprising at least one horizontal plate member secured transversely to the vertical wall of said column, flange means vertically upstanding around the periphery of said plate member defining a well, a plurality of openings distributed over the surface of said plate member and communicating from one side to the other, a hollow cylindrical member in each of said openings and extending above the plane of said plate member, said cylindrical member having a passage extending along the height thereof and within said plate member for communicating through the wall into the hollow interior, the passage being adjusted so that the total throughput from all members substantially equals the normal input onto the plate member.

6. In a contact tower as recited in claim 5, wherein the passage is a slot parallel to the axis of the cylinder.

7. In a contact tower, means for distributing the downflowing liquid comprising at least one horizontal plate member secured transversely to the vertical wall of said column, flange means vertically upstanding around the periphery of said plate member defining a well, a plurality of openings distributed over the surface of said plate member and communicating from one side to the other thereof, an elongated cylindrical porous member in each of said openings and having a multiplicity of minute pores throughout the entire body thereof to greatly restrict the rate of flow of fluid therethrough, the porosity of said members being adjusted so that the total throughput from all members substantially equals the normal input onto the plate member.

8. In a contact tower as recited in claim 7 wherein each porous member is frictionally held in an opening pressed through said plate member.

References Cited

UNITED STATES PATENTS

| | | | |
|---|---|---|---|
| 2,006,986 | 7/1935 | DeFlorez | 261—114 |
| 2,571,958 | 10/1951 | Slaughter et al. | 261—113 X |
| 2,575,193 | 11/1951 | Shire | 261—113 |
| 3,163,685 | 12/1964 | Gaede | 261—97 |
| 3,259,380 | 7/1966 | Brown | 261—97 |
| 2,428,922 | 10/1947 | Shoresman | 261—97 X |
| 2,939,771 | 6/1960 | McDonald et al. | 261—113 X |
| 3,235,344 | 2/1966 | Dreyer et al. | 261—113 X |

OTHER REFERENCES

Support Plates, Distributors and Hold-Down Plates, Design Manual TA-40R, U.S. Stoneware Co., Akron 9, Ohio, April 1961, 261-95, pp. 1, 4, 10, 11, 16 and 22 relied on.

TIM R. MILES, *Primary Examiner.*

U.S. Cl. X.R.

261—113